United States Patent [19]
Rusin, Jr.

[11] Patent Number: 5,511,785
[45] Date of Patent: Apr. 30, 1996

[54] GOLF CLUB WITH SHAFT RECESSING DIVOT TOOL

[76] Inventor: Richard E. Rusin, Jr., 6120 W. Tropicana A-16/368, Las Vegas, Nev. 89103

[21] Appl. No.: 349,886

[22] Filed: Dec. 6, 1994

[51] Int. Cl.⁶ .............................. A63B 53/00; A01B 1/04; A01B 1/24
[52] U.S. Cl. ........................ 473/286; 172/378; 473/408
[58] Field of Search ............................ 273/162 R, 162 F, 273/32 R, 32 B; 172/371, 372, 373, 378; 7/118; 81/3.35; 30/151, 162, 164

[56] References Cited

U.S. PATENT DOCUMENTS

| | | |
|---|---|---|
| 802,264 | 10/1905 | Brown . |
| 2,739,331 | 3/1956 | Goodman . |
| 3,318,628 | 5/1967 | White . |
| 3,539,017 | 11/1970 | Johnson ................................. 273/32 B |
| 3,698,720 | 10/1972 | Gudmundsen . |
| 3,771,794 | 11/1973 | Crockett ............................. 273/162 F |
| 4,216,831 | 8/1980 | Ritchie . |
| 4,787,632 | 11/1988 | Nigrelli et al. . |
| 4,799,684 | 1/1989 | Rango ................................. 273/162 F |
| 4,862,970 | 9/1989 | Hlavacek ............................ 273/162 R |
| 4,925,190 | 5/1990 | Learned .............................. 273/162 F |
| 4,955,609 | 9/1990 | Kassen ................................ 273/162 F |
| 5,004,240 | 4/1991 | Tsukamoto . |
| 5,110,123 | 5/1992 | Larson . |
| 5,190,288 | 3/1993 | Rogers . |
| 5,377,977 | 1/1995 | MacNeary ........................... 273/162 F |

*Primary Examiner*—Sebastiano Passaniti
*Attorney, Agent, or Firm*—Quirk & Tratos

[57] ABSTRACT

An improved golf club including a shaft recessing divot tool is provided. The divot tool is a body having a first end portion connected to the club, and a second end portion including two extending prongs. The first end portion of the tool is cylindrical and includes a slot which engages a pin located in the hollow end of the shaft of the club. The prongs at the second end portion are located side-by-side and include tapered end portions for penetrating turf or soil. The tool is movable from a first locked position in which the tool is recessed substantially within the shaft of the club, to a second locked and extended position in which the prongs of the tool extend outwardly from the end of the shaft for use by a golfer.

11 Claims, 1 Drawing Sheet

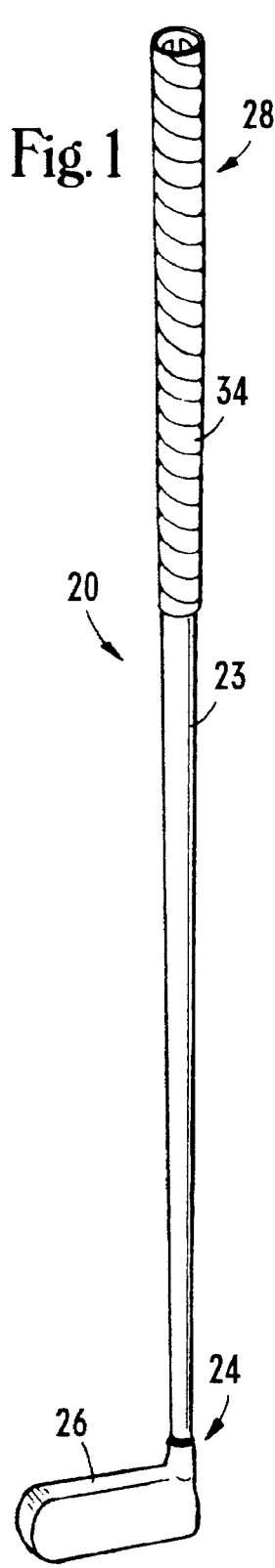
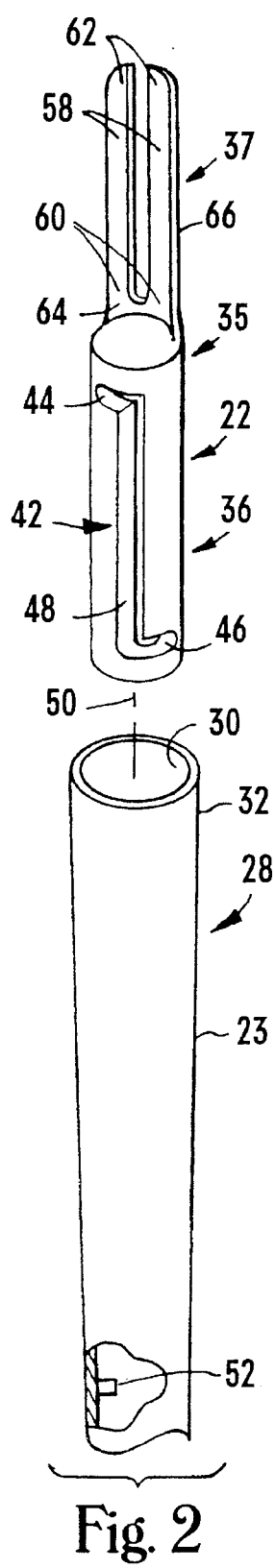
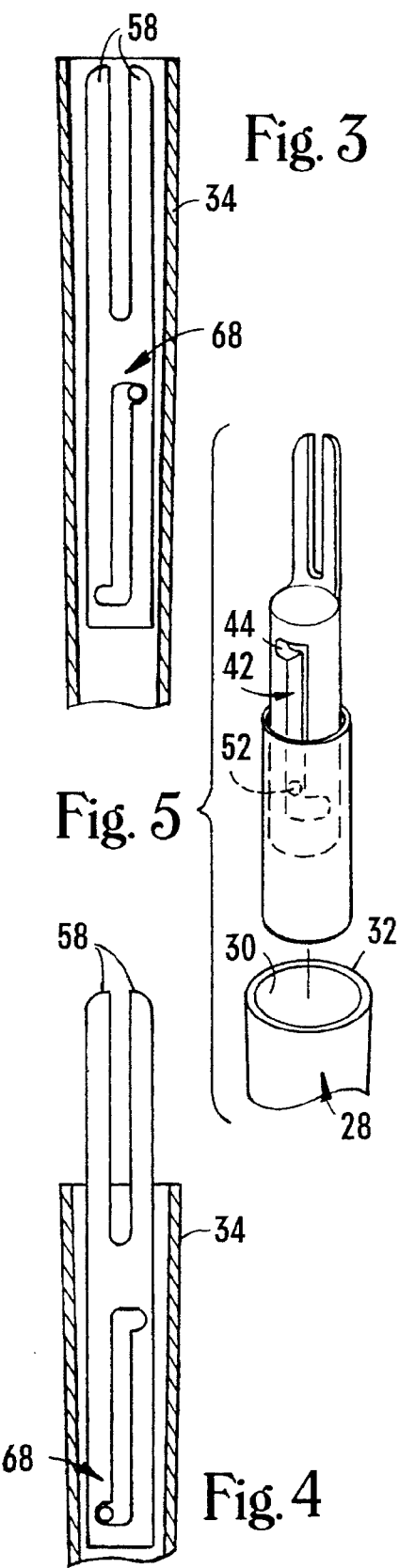

GOLF CLUB WITH SHAFT RECESSING DIVOT TOOL

FIELD OF THE INVENTION

The present invention relates to an improved golf club. In particular, the present invention relates to a golf club having a divot tool located in the handle thereof.

BACKGROUND OF THE INVENTION

Over past few years, the cost of maintaining golf courses has risen substantially. In particular, maintaining the playing surface in a high quality condition is time consuming and costly. For this reason, golf courses are now very strict in requiring that golfers repair the course when damaged.

Often, golfers remove or damage a section of grass or turf when swinging their clubs or when their ball hits or lands on the turf. This section of damaged grass, called a divot, is usually either a section of turf completely torn from the remainder of the ground, a section of turf compressed and driven into the turf ahead of the club, or a section of compressed turf caused when the ball hits the turf with high velocity.

First, a golfer may swing his club into the ground, first scraping a layer of grass from the underlying soil, and then compressing this grass and dirt into the turf ahead of the club as the club is driven deeper into the ground. This action produces a section of bare ground or soil, and a small mound of grass and dirt in an area in front of the bare soil in the direction of club movement.

Second, the golfer may swing his club through the turf, shearing an entire section of grass and attached underlying dirt, from the remaining turf. This section of turf is often thrown ahead of the golfer by the action of the club.

In either instance, a marred section of turf, or "divot" is created in the golf course surface. While these divots are usually only a few inches long and a few inches wide, after numerous golfers play a given course, the number of damaged spots in the course becomes substantial. This is especially true in high traffic areas such as tees boxes and around greens.

Lastly, and most commonly, golf balls which hit the greens with high velocity "dent" the green, compressing a section of turf downwardly into the underlying soil. The result is a depression in the green surface.

Golfers have resorted to a number of innovative techniques for repairing divots. In the case when the divot is completely removed from the surrounding turf, a golfer locates the divot and replaces it over the section of bare dirt from which is was removed ("divot holes"). The golfer then presses down on the divot to integrate it with the underlying soil, usually by stepping on it with a foot.

Repair of a divot where a section of turf is compressed is much more difficult. In particular, if a section of turf has been gouged by a club, the golfer must retrieve the grass from the compressed mound and stretch it out over the bare spot of dirt. Golfers often attempt to fix these divots by pressing on the mound with the spikes on their shoes. Normally, however, this simply flattens the mound and leaves a substantial portion of the bare spot uncovered.

When a "dent" or compressed area in the green is formed, the golfer must expand the soil underlying the compressed portion of green, lifting the overlying grass upwardly.

Normally, a golfer uses the tapered end of a golf tee to dig or pry the grass or turf from the mound, or presses the tee under the compressed spot on the green and pushes it upwardly. A tee is useful in this task, but because of its small size and shape, it is hard to grip and is ill-suited to accomplish this task.

Some divot fixing "tools" have been developed. These tools must be carried by the golfer separately from all of the other golfing equipment. Normally, a golfer keeps such equipment in his bag, or in his pocket or golfcart during play.

Because of the inconvenience of carrying these tools at all times, they often do not get used. In particular, when the tools are left in a bag, the golfer is usually some distance from the tool when it is needed. For example, a golfer parks his cart holding his bag on the cart path and then walks some distance to a tee box. After teeing off, the golfer needs to replace or fix the divot, but does not desire to walk the long round trip to the cart and back to retrieve the tool. Further, the golfer rarely remembers to bring the tool with him in the first instance, or is already carrying several clubs and tees preventing him from also carrying the tool.

These tools are also hand-held, forcing the golfer to bend over or get on his hands and knees to locate the tool in the appropriate position to fix the divot. This activity becomes unpleasant as a golf game continues and a golfer becomes fatigued.

There remains a need, therefore, for a divot fixing tool which a golfer can use to successfully repair a divot, and which is convenient to use and store.

SUMMARY OF THE INVENTION

In accordance with the present invention, a golf club having a divot fixing tool located in the shaft thereof is provided. In general, the tool comprises a body having a first end portion for connection to the club, and a second end portion including prongs for engaging turf.

The first end portion of the body is preferably cylindrical and of a size which allows it to fit into the hollow "gripping" end of a golf club. Two prongs, arranged in side-by-side fashion, extend from said first end portion. The prongs are rigid and strong and have tapered free ends for easy penetration into the ground.

Means for locking the tool in the shaft are located on the club and the body of the tool. The means comprises a pin located on an inner surface of the shaft of the club which engages a slot in the first end portion of the tool body. The slot includes first and second locking portions located at opposite ends of an elongate connecting slot portion.

The slots in the body engage the pin such that the tool can be moved from a first locked position in which it is entirely located within the hollow end of the shaft, to a second locked position in which the prongs extend outwardly from the shaft.

A user of the device of the present invention locates the tool in its locked position in the shaft while using the club to hit a ball. In this position, the pin engages one of the locking portions of the slot in the tool body, retaining the ends of the prongs below the end of the club.

The user moves the tool from the first locked and retracted position to the second locked extended position for use in fixing a divot. In this position, the prongs extend from the shaft. The user presses the prongs into the ground, moving grass and turf as necessary, to fix the divot. The prongs are retained in their extended position by the interengagement of the pin and the other locking portion of the slot in the tool body.

Once the user has completed fixing the divot, the user moves the tool back into its retracted and locked position for further use of the club.

Further objects, features, and advantages of the present invention will become apparent from the detailed description of the drawings which follows, when considered with the attached figures.

DESCRIPTION OF THE DRAWINGS

FIG. 1 is a perspective view of a golf club of the present invention;

FIG. 2 is a exploded view of the club of FIG. 1, illustrating one end of the shaft and a divot fixing tool;

FIG. 3 is a partial cut-away view of the club of FIG. 1, illustrating the divot tool in a recessed position within the shaft of the club;

FIG. 4 is a partial cut-away view of the club of FIG. 1, illustrating the divot tool in an extended position; and FIG. 5 is a perspective view of a second form of the present invention in which a tool is located in a sleeve which is in turn located in the end of the shaft of a club.

DETAILED DESCRIPTION OF THE PREFERRED EMBODIMENT

FIG. 1 illustrates an improved golf club 20 in accordance with the present invention which includes a divot fixing tool 22. The club 20 is similar to those well known in the art, comprising a shaft 23 having a first end portion 24 with a head 26 or golf ball striking surface thereon, and a second end portion 28 for gripping by a user.

The shaft 23 is hollow along all or a substantial portion of its length, the shaft thus having an inner surface 30 and an outer surface 32. A grip 34 is located on the outer surface 32 of the shaft 23 at the second end portion 28 thereof. Normally, the grip 34 extends over and occludes the open end of the shaft 23 at the second end 28. In the present invention, however, the open end of the shaft 23 is not obstructed by the grip 34.

In accordance with the present invention, and as illustrated in FIGS. 1 and 2, the divot tool 22 is connected to the shaft 23 of the club 20. While the tool 22 of the present invention can be used with any club 20, because most divot repair occurs on golf course greens, the tool 22 is preferably used with a golf ball putter.

The tool 22 generally comprises a body 35 having a first end portion 36 and a second end portion 37. The entire body 35 is preferably made of strong, weather resistant material, such as aluminum or stainless steel. In particular, it is desired that the body 35 be made of a material which does not corrode when exposed to wet soil and other elements.

The first end portion 36 of the tool 22 is a generally cylindrical body about 1–2 inches, and most preferably about 1.5 inches long, and 0.3–0.7 inches, and most preferably about 0.5 inches in diameter.

Means 68 for locking the tool 22 in the shaft 23 in a first position in which it is recessed in the shaft 23 of the club 20, and a second position in which the tool 22 is extended outwardly therefrom. Preferably, the means 68 comprises a slot 42 in the first end portion 36 of the tool 22 and a pin 52 connected to the shaft 23.

The slot 42 has a first locking portion 44, a second locking portion 46, and an elongate connecting portion 48, is located in the first end portion 36 of the body 35. The slot 42 passes completely through the body 35 from one side to the other.

The first and second locking portions 44, 46 preferably extend perpendicular to a centerline 50 running along the length of the body 35. Each of the first and second locking portions 44, 46 of the slot 42 are about 0.1–0.3 inches long. The elongate portion 48 preferably extends along the centerline 50 of the body 35, and is about 1.1–1.4 inches long.

The first locking portion 44 is located at an end of the elongate portion 48 of the slot 42 nearest the second end of the body 35. The first locking portion 46 of the slot 42 preferably extends at a ninety (90) degree angle with respect to the elongate portion of the slot 42 in one direction.

The second locking portion 46 is preferably located at the end of the elongate slot 48 opposite the first locking portion, and preferably extends in the direction opposite the first locking portion 44.

It is possible for the first and second locking portions 44, 46 of the slot 42 to extend from the elongate portion 48 in the same direction. Alternatively, they can extend opposite directions from one another, reversed from the directions shown in FIGS. 2–4. All of the portions 44, 46, 48 of the slot 42 are preferably about 0.1–0.2 inches, and most preferably about 0.13 inches wide, to permit location therein of the pin 52, and at the same time not compromise the structural integrity of the body 35.

The pin 52 is connected to the inside surface 30 of the shaft 23 some distance from the second end thereof. As illustrated, the pin 52 is connected to the shaft 23 and extends outwardly therefrom and terminates in the hollow portion of the shaft. The pin 52 can span the inside of the shaft 23 and be connected at both ends to the inner surface 30 of the shaft, however. The pin 52 is preferably about 0.1–0.5 inches long, and about 0.1 inch in diameter. In any case, the pin 52 should have a diameter less than the width of the slot 42 in the body 35.

As illustrated in FIGS. 3 and 4, the pin 52 penetrates the slot 42 in the body 35 of the tool 22. If the pin 52 spans the inside of the shaft 23, the pin 52 passes entirely through the slot 42.

The means 68 for locking the tool may comprise any number of other structures. For example, the means 68 may comprise an interengaging tooth and notch, a mechanism for spring-loaded retraction and extension of the tool, a ball bearing for interengagement with a recess, or other similar means 68. Further, while it is preferred that the means 68 retain the tool 22 to the club 20 at all times, the tool 22 can be selectively removable from the club 20.

The second end portion 37 of the body 35 preferably includes between one and five, and most preferably two, divot engaging prongs 58. The prongs 58 include a first end portion 60 and second end portion 62. Each prong 58 is preferably connected at its first end portion 60 to the body 35 of the tool 22, and formed integrally therewith.

Each prong 58 preferably tapers in size from the first end portion 60 to the second end portion 62. At the second end portions 62, the prongs 58 are each about 0.1–0.2 inches in width, and spaced apart by about 0.1–0.2 inches. Each prong 58 is about 1–2 inches, and most preferably about 1.5 inches in length.

A front side 64 of each of the prongs 58 is flat, while a rear side 66 of each of the prongs 58 is curved. The rear side 66 of each prong 58 is preferably an extension of the first portion 36 of the body 35 in shape. The second end portion 56 of each prong 58 is preferably bevelled to create a sharp edge on the end of the prong 58 for engaging the ground, including grass or soil.

Use of the divot tool 22 of the present invention will now be described in conjunction with FIGS. 3 and 4.

During play, the tool 22 is located in the shaft 23 of the club 20 in a recessed state, as illustrated in FIG. 3. In this position, all of the first end portion 36 of the body 35, and a majority of the second end portion 36 including the prongs 58 is located within the shaft 23 of the club 20. Only a small portion of the second end portion 62 of each prong 58 extends beyond the end of the shaft 23 at the second end thereof.

The tool 22 is locked in this recessed state within the shaft 23 via the interengagement of the pin 52 and slot 42. In particular, as illustrated in FIG. 3, the pin 52 is located in the second portion 48 of the slot 42 at the top of the elongate portion 44. Removal of the tool 22 is prevented via because of the location of the pin 52 in this portion 46 of the slot 42.

After creating a divot in the green or other portion of a golf course or other surface, the golfer uses the tool 22 of the present invention to replace or fix the divot. In particular, the golfer extends the tool 22 from the shaft 23 for engagement with the turf for use in fixing the divot.

In order to extend the tool 22, the golfer grasps the second end portion 62 of the body 35 (at the second end portion 56 of the prongs 58) and rotates it until the pin 52 in the second portion 46 of the slot 42 is aligned with the elongate portion 48 of the slot. The golfer the pulls upwardly on the tool 22 until the pin 52 hits the bottom of the elongate portion 48 of the slot 42.

The golfer then rotates the body 35 again, moving the pin 52 to the end of the first portion 44 of the slot 42 furthest from the elongate portion 48 thereof. The tool 22 is then in the position illustrated in FIG. 4.

The golfer orients the club 20 such that the second end 28 thereof is facing the ground, with the prongs 58 of the tool 22 extending downwardly. The golfer then presses the prongs 58 into the turf and manipulates the turf or grass, fixing the divot.

The tool 22 is prevented from moving back or being pressed into the shaft 23 during this process because of the interengagement of the pin 52 in the first portion 44 of the slot 42.

After use, the golfer reverses the above process, aligning the pin 52 with the elongate portion 48 of the slot. Then, the user pushes the tool 22 back into the shaft 23 and turns it to lock it into its retracted state.

A user of the tool 22 of the present invention can fix a divot without the need to bend over. Further, because the tool 22 is located at the end of the elongate shaft 23, the golfer has increased leverage on the tool 22 during use. Further, the tool 22 is conveniently located in a club such as a putter, and is thus with the golfer at the exact time it is needed.

When a golfer already owns a club 20 not including the tool 22 of the present invention, it is desirable that the tool 22 be easily installed therein. In this case, as illustrated in FIG. 5, the tool 22 is located in an elongate sleeve 70 which is attached to the housing. The sleeve 70 is preferably tubular in shape, and contains the tool 22 described above, but having slightly smaller radial dimensions. Further, the locking means 68 which are described above, such as the pin 52, are attached to the inside surface of the sleeve, instead of the shaft. In this form, the tool 22 has the form of a self-contained cartridge which can be located in the end of the club 20.

To install the tool 22 in this form into a club, the golfer removes the grip at the end of the club 20 and presses the sleeve 70 containing tool 22 into the shaft. Adhesive or other attachment means are used to securely locate the sleeve in the shaft and prevent both its movement.

In operation, the tool 22 mounted in the sleeve works the same way as described above, the tool 22 moveable between a first retracted position to a second extended position.

It will be understood that the above described arrangements of apparatus and the method therefrom are merely illustrative of applications of the principles of this invention and many other embodiments and modifications may be made without departing from the spirit and scope of the invention as defined in the claims.

I claim:

1. A golf club having an elongate shaft with a first end portion having a ball striking surface thereon and a second end portion for gripping by a user, said shaft at said second end portion being hollow and having an inner surface and outer surface, said club further comprising:

a divot fixing tool comprising a body having a first end portion and a second end portion including at least one elongate ground-engaging prong, said tool moveable between a first position in which said tool is retracted substantially within said club and a second position in which said tool extends outwardly of said club, and including locking means comprising a pin connected to said shaft and an elongate slot in said tool body for retaining said tool in said retracted and extended positions.

2. The club of claim 1, wherein said tool is located in a sleeve.

3. The club of claim 1, wherein said slot includes a first and a second locking portion and a connecting portion.

4. The club of claim 1, wherein said tool is located at least partially within a sleeve located in said shaft, and said pin is connected to said sleeve.

5. A golf club having an elongate shaft with a first end portion and second end portion, a club head located at the first end portion of said shaft, and a user gripping location at the second end portion, said club further comprising:

a divot fixing tool located at said second end portion of said shaft, said tool comprising a body having a first end portion and a second end portion, said first end portion being cylindrical in shape and having a slot therein for acceptance of a pin, and said second end-portion including two elongate prongs and, wherein said slot includes a first locking portion and a second locking portion connected by an elongate connecting portion.

6. The golf club of claim 5, wherein said first and second locking portions extend transverse to a centerline of said body, and said connecting portion extends parallel to said centerline.

7. In combination, a golf club having a shaft with a first end portion with a club head thereon and a second end portion for gripping by a user, and a divot fixing tool, said tool comprising a body having a first end portion and second end portion, said first end portion including locking means for retaining said body to said shaft and said second end portion of said tool including at least one elongate prong and wherein said locking means comprises a pin on said shaft and a slot in said body.

8. The combination of claim 7, wherein said slot includes a first locking portion, a second locking portion and a third connecting portion.

9. A method of using a divot fixing tool located in the shaft of a golf club comprising:

grasping a first end portion of said tool;

rotating said tool about a centerline extending through said shaft to unlock said tool;

extending said tool from within said shaft;

rotating said tool about said centerline to lock said tool with respect to said shaft; and engaging said first end portion of said tool with a section of ground.

10. A golf club having an elongate shaft with a first end portion having a ball striking surface thereon and a second end portion for gripping by a user, said shaft at said second end portion being hollow and having an inner surface and outer surface, said club further comprising:

a divot fixing tool comprising a body having a first end portion and a second end portion including at least one elongate ground-engaging prong, said tool moveable between a first position in which said tool is retracted substantially within said club and a second position in which said tool extends outwardly of said club, and including locking means for retaining said tool in said retracted and extended positions, and wherein said first end portion of said body is cylindrical in shape and each prong is formed integrally with and extends from said second end portion.

11. A divot fixing tool for location in a golf club having a shaft with a first end portion with a club head thereon and a second end portion for gripping by a user, said divot fixing tool comprising a body having a first end portion and a second end portion, and a sleeve for containing a portion of said tool and connection thereof to said shaft, said first end portion of said tool including locking means for retaining said body to said sleeve, and said second end portion of said tool including at least one elongate prong, wherein said locking means comprises a pin on said sleeve and a slot in said body.

* * * * *